Oct. 21, 1947.    L. A. SMITH    2,429,375
SOCKET FOR DRILLING AND COUNTERSINKING TOOLS
Filed Aug. 11, 1943
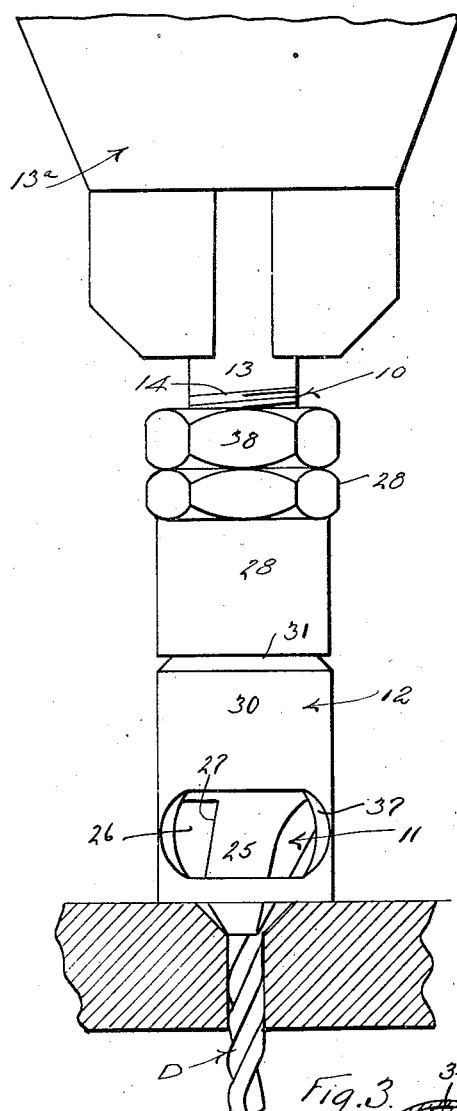
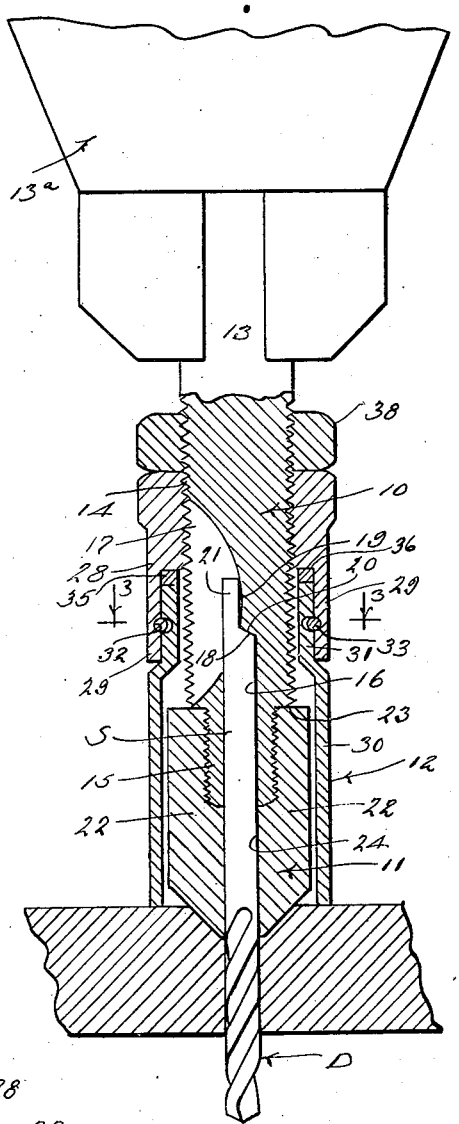
Inventor
Lawson A. Smith Patented Oct. 21, 1947

2,429,375

UNITED STATES PATENT OFFICE 2,429,375

SOCKET FOR DRILLING AND COUNTERSINKING TOOLS

Lawson A. Smith, Los Angeles, Calif., assignor to Robert H. Clark, Los Angeles, Calif.

Application August 11, 1943, Serial No. 498,215

2 Claims. (Cl. 279—102)

This invention relates to drilling tools and relates more particularly to a combination drilling and countersinking tool. A general object of this invention is to provide a drilling and countersinking tool embodying a practical and particularly effective stop means.

Countersinking tools or countersinks are extensively employed to form depressions or counterbores at the mouths of drilled openings. Drilling tools and countersinking tools have been equipped with stops to limit the depth of the drilled bores or the countersinks, as the case may be. Such stops are usually in the form of tubular sleeves surrounding the bodies of the tools and projecting downwardly therefrom to engage the work and thus limit the depth of the cut. The stops are sometimes adjustable to permit drilling or countersinking to selected depths but the stops, whether adjustable or not, are usually secured to the body of the tool to rotate therewith.

When the rotating stop of a conventional drilling or countersinking tool comes into engagement with the work it often mars or defaces the work, this being particularly true where the work is formed of a relatively soft material such as aluminum, bronze, brass, wood, etc. Further, the engagement of the positively driven stop with the work puts a sudden increased drag on the tool and where the engagement of the stop with the work is not true the tool is subjected to lateral forces.

Another object of this invention is to provide a stop for a drill or a countersink that is rotatably mounted on the tool so that it immediately comes to rest upon engaging the work and does not mar the work or impose a drag on the tool. The active member of the stop provided by this invention and the body of the tool are related for free relative rotation and when the stop member comes into contact wtih the work to limit the depth of the cut, it immediately stops rotating and, therefore, cannot injure the work or subject the tool to a drag or lateral forces.

Another object of this invention is to provide a stop means of the character mentioned embodying a novel, simple, and very effective structure for rotatably connecting the active member of the stop with the part of the stop which is attached to the body of the tool.

Another object of this invention is to provide a tool of the character mentioned in which the stop means is adjustable so that the depth of the cut or countersink may be varied at will. The adjustment provided for the stop means is such that very accurate or delicate adjustments may be made.

Another object of this invention is to provide a combination drilling and countersinking tool in which the stop means is operable to determine or limit either the depth of the drilled opening or the depth of the counterbore, as conditions of operation may require.

Another object of this invention is to provide a combination drilling and countersinking tool of the general character described and claimed in my copending application, Serial No. 469,860, filed December 23, 1942, embodying a novel and improved means for anchoring the drill in the tool body.

The various objects and features of my invention will be fully understood from the following detailed description of a typical preferred form and application of my invention, throughout which description reference is made to the accompanying drawings, in which:

Fig. 1 is a side elevation of the improved tool provided by this invention. Fig. 2 is a longitudinal detailed sectional view of the tool and Fig. 3 is a transverse detailed sectional view taken as indicated by line 3—3 on Fig. 2.

The combination drilling and countersinking tool of the present invention may be said to comprise, generally, a body 10 operable to carry a drill D, countersink means 11 on the body 10, and adjustable stop means 12 on the body 10.

The body 10 forms a support or carrier for the other parts of the tool and is adapted to be mounted on or operated by a machine tool or drilling machine for carrying on drilling and countersinking operations. The body 10 is an elongate member and in the preferred construction is a simple, one-piece element. The upper portion of the body 10 constitutes what I will term a shank 13. The shank 13 may be designed and proportioned to be received or operated by chucks, adapters, spindles, etc., of different kinds, depending upon the machine tool or drilling tool by which the device is to be operated. In the case illustrated the shank 13 is a simple, elongate cylindrical part of uniform diameter, shown held in the jaws of a chuck 13ª. The major portion of the body 10 below the shank 13 is provided with a continuous thread 14. The lower portion of the body 10 is reduced in diameter to constitute a stem 15 for carrying the countersinking means 11, as will be subsequently described.

In accordance with the invention the body 10 is constructed to carry the drill D. A central longitudinal opening 16 extends upwardly through the body stem 15 from its lower end. The opening 16 is intended to receive the shank S of a drill D and may be shaped and proportioned to carry shanks of any selected type, size and shape. In the case illustrated the opening 16 is a simple, cylindrical opening of uniform diameter receiving the plain cylindrical shank S of the typical drill D.

The shank receiving opening 16 terminates immediately above the upper end of the stem 15 and its upper end joins a lateral slot 17 formed in the body 10 from one side. The slot 17 may be a milling-tool cut in the body 10, as shown in Fig. 2. The slot 17 extends longitudinally of the body 10 and its width is equal to or slightly greater than the diameter of the opening 16. In depth the slot 17 extends into the body 10 to a point slightly beyond the center of the body. The slot 17 may be said to continue upwardly from or beyond the upper end of the opening 16 and, as seen in Fig. 2 of the drawings, the upper end wall of the opening 16 forms a downwardly facing shoulder 18 at the point where the opening and slot merge.

The upper end portion of the drill shank S is provided with a "flat" 19 so it has a shoulder 20 engageable with the shoulder 18 and a tongue 21 which enters the slot 17. The flat 19 bears on the bottom wall of the slot 17 so that torque is positively transmitted from the body 10 to the drill D. The cooperation of the shoulder 20 with the shoulder 18 provides for the transmission of axial thrusts from the body 10 to the drill D. It will be observed that the drill D is effectively connected with the body 10 for rotation thereby without the employment of pins, set screws, or the like. The slot 17 forms a knock-out opening to facilitate the removal of the drill D when the same is to be replaced.

The countersink means 11 is operable to form a countersink or counterbore at the upper end of the opening formed by the drill D, the countersinking operation being performed as a continuation of the drilling operation. In the preferred construction illustrated the countersink means 11 is in the form of a single unit removably secured to the body 10 so that it may be replaced when worn or when countersink openings of different shapes, depths, etc., are to be formed. The countersink means 11 includes a member 22 screw threaded on the body stem 15. The upper end of the member 22 may be engageable with the body shoulder 23 that occurs at the upper end of the stem 15. This engagement may limit the threading on of the member 22. As best illustrated in Fig. 2 of the drawings, the member 22 projects some distance downwardly beyond the lower end of the stem 15. A central longitudinal opening 24 extends through the member 22 to receive the shank S of the drill D. The engagement of the shank S in the opening 24 assists in supporting and stabilizing the drill.

The lower end of the countersink member 22 is provided with cutting parts 25 for drilling or forming the countersink depressions or counterbores in the mouths of the openings that are formed by the drill D. The cutting parts 25 may be of different natures and shapes to form countersink depressions of various depths and configurations and the countersink member 22 may be replaced by similar members having cutting parts of selected shapes and sizes. There is preferably a plurality of circumferentially spaced cutting parts 25 projecting from the lower end of the member 22. In the particular form of the invention illustrated the cutting parts 25 are integral with the member 22, it being apparent that they may be separate elements brazed or otherwise secured to the member 22. The cutting parts 25 illustrated in the drawings slope downwardly and inwardly from the lower end of the member 22 to the drill D. The cutting parts 25 are separated by slots or grooves 26 in the member 22 and are shaped and ground to have pitched cutting edges 27. The cutting parts 25 illustrated in the drawings are designed to form countersinks having pitched or tapered walls. The number of cutting parts 25 formed on the member 22 may be varied but I have found it most desirable to employ three cutting parts.

The stop means 12 is an important feature of the invention. The stop means 12 is adjustably supported by the body 10 and is operable to engage the work to limit the depth of the opening formed by the drill D or the depth of the countersink formed by the cutting parts 25. The means 12 includes a tubular part 28 surrounding the body 10 and provided with an internal thread which cooperates with the body thread 14. The part 28 is knurled or shaped for ready engagement to facilitate its manual turning or rotation. In the preferred construction illustrated the upper portion of the part 28 is hexagonal, to be readily engageable by a wrench or other turning tool. A downwardly extending apron 29 is provided on the lower end of the part 28. The apron 29 surrounds the body 10 with considerable clearance.

The stop means 12 further includes an active member or work engaging member 30 which surrounds the body 10 and the member 22 with suitable clearance. The upper portion 31 of the member 30 is of reduced diameter and is rotatably received in the apron 29. The member 30 is of substantial length and extends downwardly from the apron 29 to project beyond the member 22 as will be more fully described.

The invention provides novel and very effective means for rotatably connecting the active stop member 30 with the adjustable part 28. The reduced portion 31 of the member 30 is proportioned and is finished to accurately rotatably fit within the apron 29. The interior of the apron 29 and the exterior of the portion 31 have registering annular grooves 32. The grooves 32 preferably have curved concave walls of about 180° extent and are adapted to register to form an annular channel of substantially cylindrical cross section. A ring 33 is engaged in the grooves 32 to rotatably connect the active stop member 30 with the adjustable stop part 28. The ring 33 is a split spring ring. When the part 28 and the member 30 are to be assembled the ring 33 is engaged in the groove 32 of the reduced portion 31 and is contracted. The groove in the member 30 is deep enough to receive the ring 33. The reduced portion 31 is entered in the arpon 29 and the contracted ring 33 moves upwardly through the apron with the portion 31. When the ring 33 reaches the groove 32 in the apron 29 it expands into active position, as shown in Fig. 2. This rotatably connects the member 30 with the adjustable part 28. Fig. 3 illustrates the manner in which the ring 33 engages in the two grooves 32 to permanently and dependably connect the member 30 and the part 28. The corners or ends of the ring 33 are bevelled or rounded off at 34 so that they do not drag or cut into the apron 29.

The invention provides a thrust ring 35 of bronze, fiber, or the like, between the upper end of the reduced portion 31 and the internal shoulder 36 which occurs in the part 28 at the upper end of the apron 29. The bearing or thrust ring 35 assumes the end thrusts resulting from contact of the member 30 with the work, thus relieving the connecting ring 33 of such thrusts. The lower end of the active stop member 30 is preferably flat and smooth to have flat, even engagement with the work.

The lower portion of the active stop member 30 is provided with windows or openings 37 for discharging or clearing the chips or cuttings resulting from the drilling and countersinking operations. There may be two diametrically opposite openings 37 of substantial size. As illustrated in Fig. 1 of the drawings, the openings 37 may be elongated circumferentially of the stop member 30 and are preferably positioned immediately adjacent the lower extremity of the stop member.

The invention includes means for setting or locking the adjustable stop means 12 in the selected or required positions. The part 28 of the stop means 12 may be threaded along the body to bring the active lower end of the stop member 30 to any required position relative to the drill D and the cutting parts 25. The locking or setting means comprises a nut 38 screw threaded on the upper portion of the body 10 and cooperable with the part 28 to set or secure the part in the adjusted position. The nut 38 may be hexagonal and of the same proportions as the upper end of the part 28.

In the use or operation of the tool a member 22 provided with cutting parts 25 of the selected length and configuration is screw-threaded on the body stem 15. A drill D of the required length and diameter is operatively mounted on the body 10 by inserting its shank S into the openings 24 and 16. The tongue 21 of the drill is engaged in the slot 17 and the shoulder 20 is brought against the shoulder 18 to provide for the transmission of the operative forces from the body to the drill. If it is desired to drill an opening of a given depth the nut 38 is backed away from the part 28 and the part is threaded along the body to bring the lower end of the stop member 30 to a position where it will cooperate with the work to limit the depth of the drilled opening. The nut 38 is then threaded along the body to clamp against and set the part 28 in the adjusted position. When the tool is operated by the machine tool or drilling machine the drill D forms a bore in the usual manner and the depth of this bore is determined by the setting of the means 12. As the drill is fed downwardly the lower end of the stop member 30 comes into contact with the work to stop advancement of the drill. The member 30 may be rotating with the body 10 but as soon as it comes into engagement with the work W it stops. The rotatably supported stop member 30 does not rotate against the work and does not mar or score the work.

When it is desired to drill openings and provide the openings with counterbores or countersinks the nut 38 is threaded free of the part 28 and the part 28 is threaded along the body to bring the lower end of the stop member 30 to a selected position at or above the cutting parts 25. The part 28 may be adjusted to a position such as illustrated in Figs. 1 and 2 of the drawings where the lower end of the member 30 is slightly below the upper ends of the cutting parts 25. With this positioning the stop member 30 is adapted to limit the depth of the countersink depressions. The nut 38 may be clamped against the part 28 to set the stop means 12 in the adjusted position. The drill D is advanced against the work and rotated in the usual manner to form the bore and the advancement may continue so that the cutting parts 25 are fed against the face of the work to form the countersink depressions. The lower end of the member 30 contacts the work to limit the depth of the countersink depression thus formed.

The stop means 12 provided by the invention may be employed on countersink tools and on drill chucks, drill holders, adapters, etc., of various styles and makes. The stop means may be modified somewhat to adapt it for use on such tools and the invention is not to be construed as limited or restricted to the specific structure illustrated in the drawings. The stop means 12 may be produced and marketed as a separate device or appliance to be used on countersinks, drilling tools, and combination countersinking and drilling tools, as the operating conditions may require.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A device of the character described including a body having a longitudinal bore entering it from one end and a lateral longitudinally extending groove in the body substantially equal in width to the diameter of the bore and having a concave bottom joining the inner end portion of the bore, the inner end wall of the bore occurring at the deepest part of the groove forming a shoulder, a tool entered in said bore, the inner portion of the tool being flattened at one side to have a tongue which enters the groove and to provide a shoulder which cooperates with the first named shoulder, the tongue having a flat face bearing on the bottom wall of the groove.

2. A structure of the character described including a body having a longitudinal bore entering it from one end and a lateral longitudinally extending groove substantially equal in width to the diameter of the bore and joining the inner end portion of the bore and extending to the center of the body, the inner end wall of the bore forming a shoulder, a tool entered in said bore, the inner portion of the tool having substantially one half of its inner end portion cut away to leave a tongue which enters the groove and to provide a shoulder which cooperates with the first named shoulder.

LAWSON A. SMITH.

REFERENCES CITED

The following references are of record in the file of this patent:

UNITED STATES PATENTS

| Number | Name | Date |
|---|---|---|
| 2,192,528 | Schmidt | Mar. 5, 1940 |
| 2,216,988 | Schmidt | Oct. 8, 1940 |
| 2,301,151 | Spievak | Nov. 3, 1942 |
| 1,264,370 | Copeman | Apr. 30, 1918 |
| 1,028,562 | Fogleman | June 4, 1912 |
| 1,043,098 | Gross | Nov. 5, 1912 |
| 726,388 | Wysong | Apr. 28, 1903 |
| 861,010 | Zeman | July 23, 1907 |

FOREIGN PATENTS

| Number | Country | Date |
|---|---|---|
| 35,610 | Denmark | 1926 |
| 85,610 | Switzerland | 1920 |
| 113,914 | Great Britain | 1918 |